W. T. STEIGER.
FOOT-WARMER.
No. 186,962 — Patented Feb. 6, 1877.
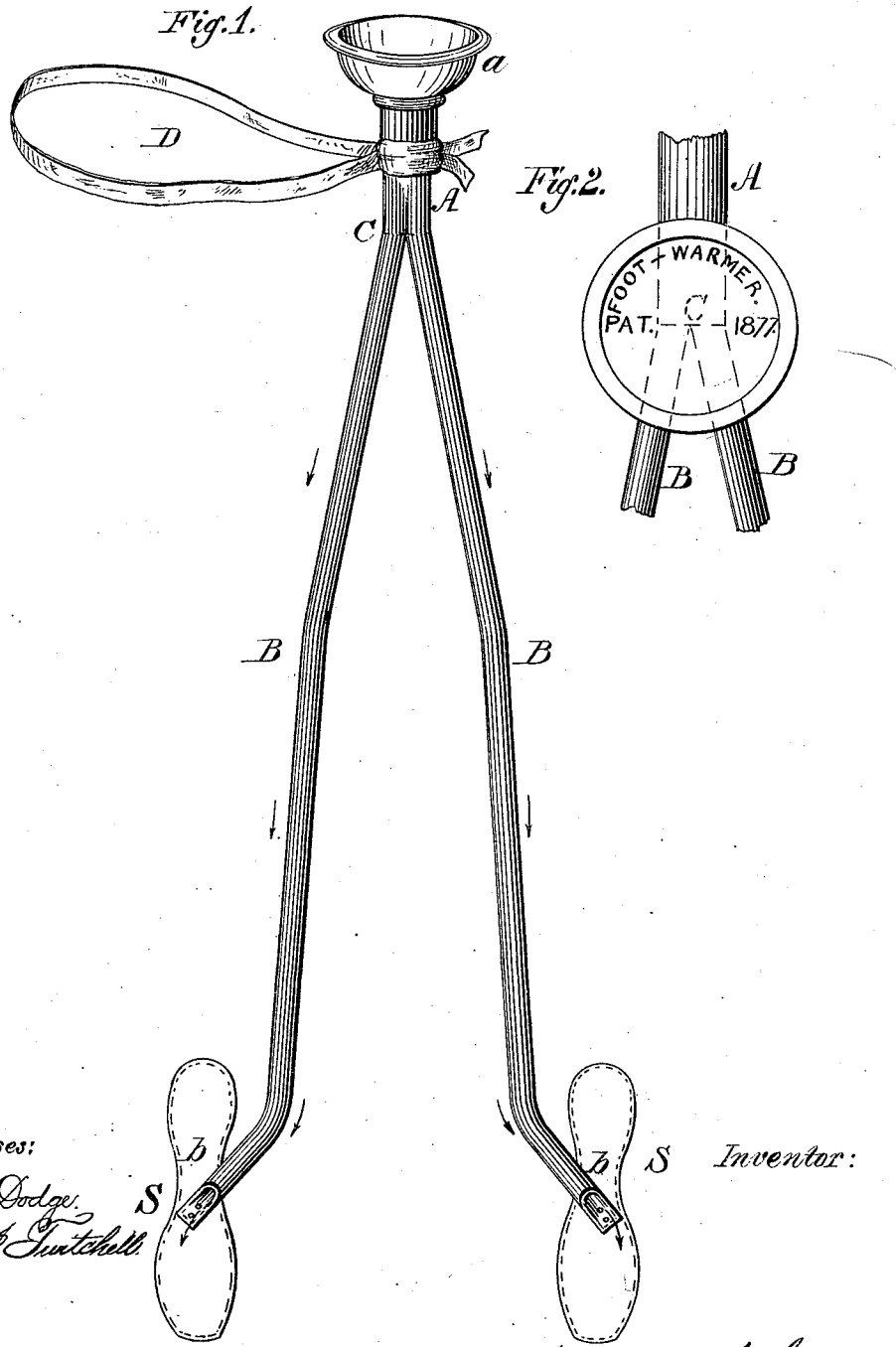

UNITED STATES PATENT OFFICE.

WILLIAM TELL STEIGER, OF HOWARD COUNTY, MARYLAND.

IMPROVEMENT IN FOOT-WARMERS.

Specification forming part of Letters Patent No. 186,962, dated February 6, 1877; application filed January 16, 1877.

*To all whom it may concern:*

Be it known that I, WILLIAM TELL STEIGER, of Howard county, and State of Maryland, have made a new and useful invention in a "Pedal Calorificator" or "Foot-Warmer," which invention is fully set forth in the following specification and drawing, (on a reduced scale,) in which—

Figure I represents the combination and parts.

As explanatory of the object of my invention I have to remark, that it is a well-established fact that our lungs constitute the laboratory of nature, within which—by a condensing process—animal heat is generated, and afterward conveyed and distributed to other portions of our bodies by the action of the heart and circulation of the blood; that, for mechanical reasons the supply to the extremities—the hands and feet—on account of their distance from the center of heat, is more or less deficient, and, consequently, they suffer most when exposed to severe outward cold; the feet, especially, by reason of their immediate contact, in winter weather, with cold floors, as in railroad-cars and other vehicles, and with the frozen ground and icy sidewalks.

Now, I find, by personal experiment, that by breathing for a short time on the bulb of a thermometer I am enabled to raise the mercury to 88° Fahrenheit—only 10° below blood-heat—which I, therefore, assume to be the natural temperature of the breath, and hence, if we suppose the outer air to be at freezing-point, (32°,) we have a difference of 56° excess of temperature, which, in the action of breathing, is totally dissipated and lost in the open air.

My invention aims at economizing and utilizing this wasted heat by any simple contrivance for conveying it to our feet, where it is so much needed, one device for which, found by practical experiment to answer very well, but, of course, subject to modifications.

I will now proceed to describe my invention.

In the accompanying drawing, Fig. I, A B B represent a light flexible india-rubber tube, from one-fourth to half an inch or more caliber, to be worn between the outer and inner garments. It is branched at C, and extends from near the wearer's chin to his feet, the upper end of the portion A (which may be of double the capacity of B) being furnished with a conical or trumpet mouth-piece, $a$—either of india-rubber, molded solid with the tube, hard wood, or ornamented bone, (metal would be too cold)—within easy reach, and when not in use concealed by the waist-coat.

S S are two movable hair-pads or cork inner soles—such as are in common use—to be inserted in the boots or shoes, and to which the branch tubes B B are either permanently attached or made fast for convenience by loops and buttons at $b\ b$ under the inside hollows of the feet when in place, and so as to discharge obliquely forward toward the toes.

A suspension neck-collar or ribbon, D, attached at C or upper portion of the tube A, completes the arrangement, except that a stiff rubber plate may be permanently attached to the tubes (or molded with them) at their junction C, to strengthen their connection and receive the date of the patent, &c., as shown in Fig. II, enlarged.

In very cold nights it is often found difficult to keep the feet comfortable in bed, especially in the case of invalids or persons of cold temperament, and, as a consequence, they spend sleepless nights.

To obviate this annoyance the above-described apparatus may be used, if preferred; but a single tube of good capacity, reaching from the mouth to the region of the feet, will be all sufficient to secure relief and comfort, and may be found more convenient.

I have found, by actual experience, that the tubes in a short time become warmed by the body, so that little heat of the breath is lost in its passage to the feet; that, accordingly, the air I find is delivered in boot or shoe with a temperature of about 84° Fahrenheit—a loss of only 4°.

After a few sharp blasts of breath at the beginning—which may be repeated at intervals—it becomes only necessary to inhale naturally with closed, and exhale with open, lips—an easy process, which I have ascertained practically may be kept up a long time, as, for example, for miles on a railroad-car, without much personal inconvenience.

What I claim as my invention, and desire to secure by Letters Patent, is—

The combination of tubes extending from a mouth-piece, and foot-coverings, for utilizing the warmth of the breath during respiration, as set forth.

WILLIAM TELL STEIGER.

Witnesses:
M. M. ROHRER,
BELLUM MILLER.